US008157896B2

(12) United States Patent
Sheehan

(10) Patent No.: US 8,157,896 B2
(45) Date of Patent: Apr. 17, 2012

(54) AIR FILTRATION SYSTEM AND METHOD

(75) Inventor: Patrick Sheehan, Washington, MO (US)

(73) Assignee: Demo Air Net, LLC, Morse Mill, MO (US)

( * ) Notice: Subject to any disclaimer, the term of this patent is extended or adjusted under 35 U.S.C. 154(b) by 758 days.

(21) Appl. No.: 11/987,695

(22) Filed: Dec. 4, 2007

(65) Prior Publication Data

US 2009/0139404 A1 Jun. 4, 2009

(51) Int. Cl.
*B01D 46/00* (2006.01)
(52) U.S. Cl. ............................................ 95/273; 55/467
(58) Field of Classification Search .................. 55/341.2, 55/341.4–341.6, 367–369, 373, 375, 377–382, 55/DIG. 2, DIG. 26, 356; 95/273
See application file for complete search history.

(56) References Cited

U.S. PATENT DOCUMENTS

| | | | |
|---|---|---|---|
| 1,613,250 A * | 1/1927 | Spielman | 15/344 |
| 2,927,659 A | 3/1960 | Pabst et al. | |
| 2,975,863 A | 3/1961 | Sosnowich | |
| 3,197,949 A * | 8/1965 | Waag | 56/202 |
| 5,730,766 A | 3/1998 | Clements | |
| 6,110,243 A * | 8/2000 | Wnenchak et al. | 55/379 |
| 6,277,770 B1 | 8/2001 | Smith, III et al. | |
| 6,830,113 B2 | 12/2004 | Moore et al. | |
| 2003/0119410 A1 * | 6/2003 | Bodaghi | 442/400 |

* cited by examiner

*Primary Examiner* — Duane Smith
*Assistant Examiner* — Karla Hawkins
(74) *Attorney, Agent, or Firm* — CreatiVenture Law, LLC; Dennis J M Donahue, III

(57) ABSTRACT

An airnet constructed of a filtering fabric sewn in the shape of a windsock is connected to the discharge end of a fan. Actuation of the fan causes ambient air to flow through the fan and into the airnet. The air passes through the filtering fabric of the airnet and particulate matter in the ambient air is trapped and retained within the airnet. The airnet and fan combined form a portable air filtration system capable of filtering the ambient air in confined spaces, such as bathrooms being finished or remodeled, in a relatively quick and efficient manner.

5 Claims, 3 Drawing Sheets

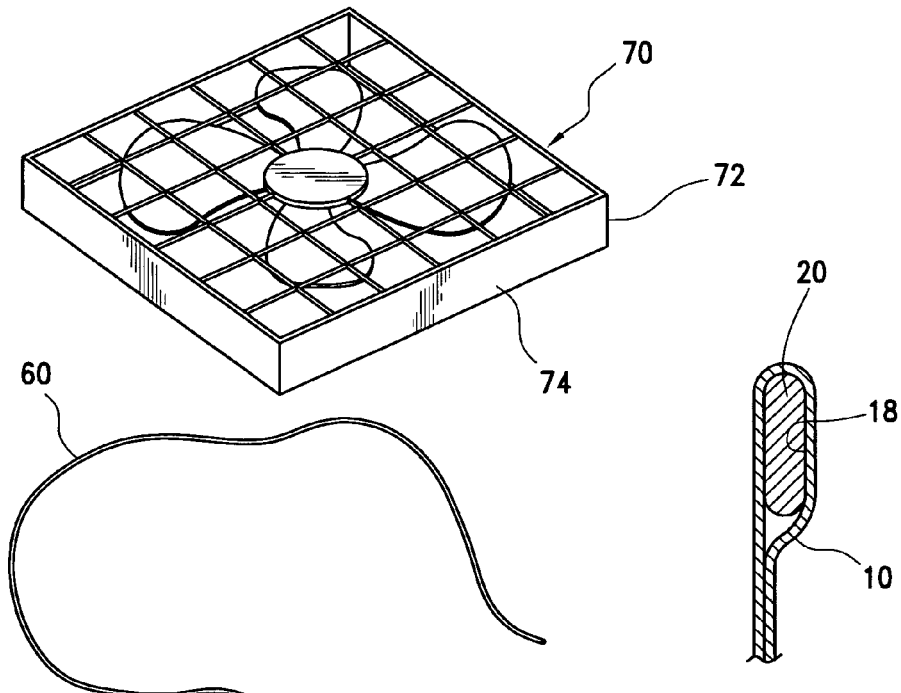
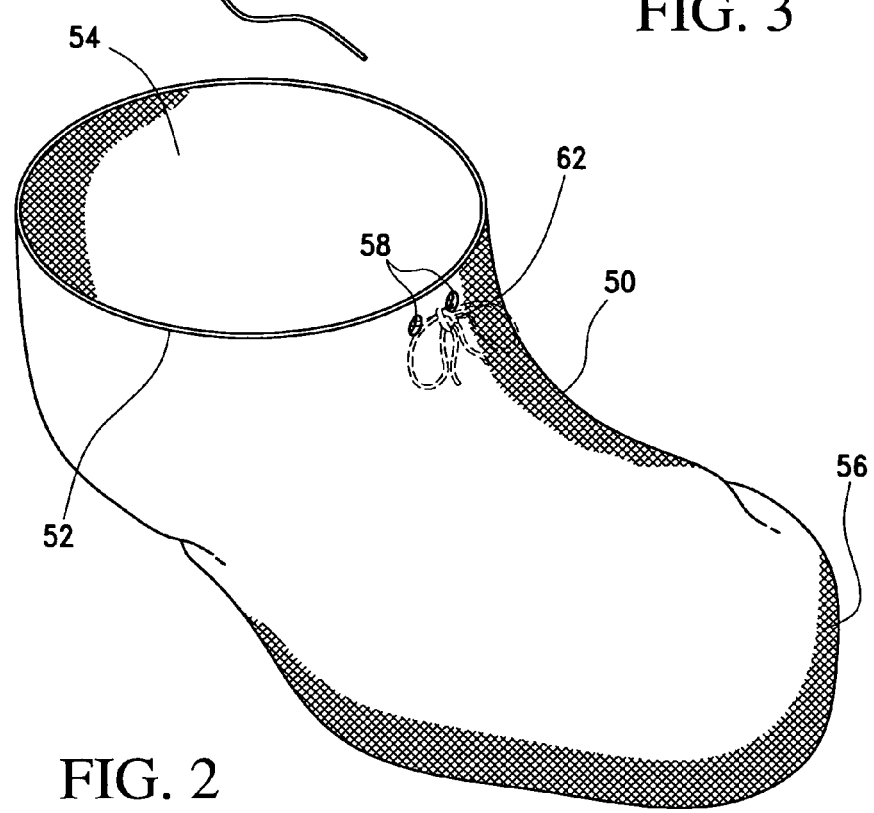
FIG. 3
FIG. 2

AIR FILTRATION SYSTEM AND METHOD

FIELD OF THE INVENTION

The present invention relates generally to the field of air filtration, and more particularly to an air filtration system and method that provides a portable and effective structure for filtering particulate matter from ambient air.

BACKGROUND

Construction of the type including finishing and remodeling of interior rooms of commercial and residential buildings typically involves procedures that cause particulate matter to be raised into the ambient air. Such particulate pollution may be even more prevalent during demolition projects.

For example, when finishing of a room requires the installation of drywall, also known as gypsum board, plasterboard, rock lath, and sheetrock, the drywall must be appropriately processed. Such processing usually includes cutting of the drywall to fit specified dimensions and to provide openings for fixtures, such as electrical switches and outlets, as well as overhead lights and ceiling fans.

Cutting of the drywall in this manner causes dust particulates to rise up into the ambient air. Since this occurs in a typically closed environment, workers are exposed to inhalation of these dust particles. Appropriate precautions, such as the use of breathing masks, must then be taken in order to limit the exposure of workers to such dust particulates.

Another construction procedure that causes dust particulates to enter the ambient air is the cutting of concrete blocks, concrete tile board, bricks, ceramic tiles, or plaster and/or fiberglass materials. Again, during the construction or finishing of rooms, such materials must be appropriately cut to size and to provide suitable access to fixtures.

In all of these processes, the dust particles tend to hang in the ambient air in a confined space, such as a bathroom, thus exposing the workers therein to breathing in such particles. As mentioned above, breathing masks may be used in order to limit such exposure, however, such masks are uncomfortable and inconvenient to wear.

Further, eye protection is also necessary in order to protect the worker's eyes from exposure to such dust particles.

Accordingly, the following disclosure discusses embodiments of a portable air filtration system that can quickly and efficiently remove particulate matter from the ambient air in confined spaces.

SUMMARY

The portable air filtration system discussed herein is composed of an airnet filtering bag. The airnet filtering bag is formed of an air permeable filtering fabric processed into the general shape of a windsock having one open end and one closed end. The open end of the airnet filtering bag is defined by a perimeter.

A closing element, such as an elastic band, or bungee cord, is retained within a chamber formed around substantially the entire perimeter of the open end. As an alternative, a pull cord having two free ends extending through respective openings in the chamber may be provided as a closing element.

The open end of the airnet is arranged to be attached to the discharge end of a fan and the closing element is configured to close the open end around a perimeter of the fan in order to retain the airnet in position thereon. This may be accomplished via the elasticity of the closing element, or in the case of the pull cord, by tying the free ends in a knot.

The chamber in which the closing element is retained may be formed by folding over and sewing a flap of the fabric at the open end onto itself. The elastic closing element can be sewn into the chamber and can extend around the perimeter of the open end.

In an exemplary embodiment, the filtering fabric has an air permeability of about 55 cfm.

The above described airnet filtering bag can be utilized in a system that includes a fan having a discharge end. The fan has a perimeter, which may be circular, rectangular, or square, or any other suitable shape. The open end of the airnet filtering bag is placed around the perimeter of the fan at the discharge end and is secured in place by the closing element.

The above described system may be used to filter ambient air by providing the above described airnet filtering bag, providing a fan having a discharge end, engaging the open end of the airnet filtering bag to the perimeter of the fan at the discharge end of the fan, closing the closing element around the perimeter of the fan to retain the airnet in position thereon, and actuating the fan in order to filter ambient air through the airnet.

Thus, a convenient and efficient portable air filtering system is provided to eliminate dust and other particulate matter from the ambient air in a substantially enclosed space is provided. Of course, the use of the disclosed air filtering system is not limited to construction or demolition sites, but may be utilized in any area where it is desired to remove particulate matter from the ambient air.

The numerous other advantages, features and functions of embodiments of an air filtration system will become readily apparent and better understood in view of the following description and accompanying drawings. The following description is not intended to limit the scope of the air filtration system, but instead merely provides exemplary embodiments for ease of understanding.

BRIEF DESCRIPTION OF THE DRAWINGS

These and other features, aspects, and advantages of the present invention will become better understood with regard to the following description, appended claims, and accompanying drawings where:

FIG. 2 is an exploded view of the airnet, closing element, and fan of a another embodiment of an air filtration system;

FIG. 3 is a partial cross-sectional view of the closing element within the chamber according to the embodiment of the air filtration system of FIG. 1;

Figure 1:
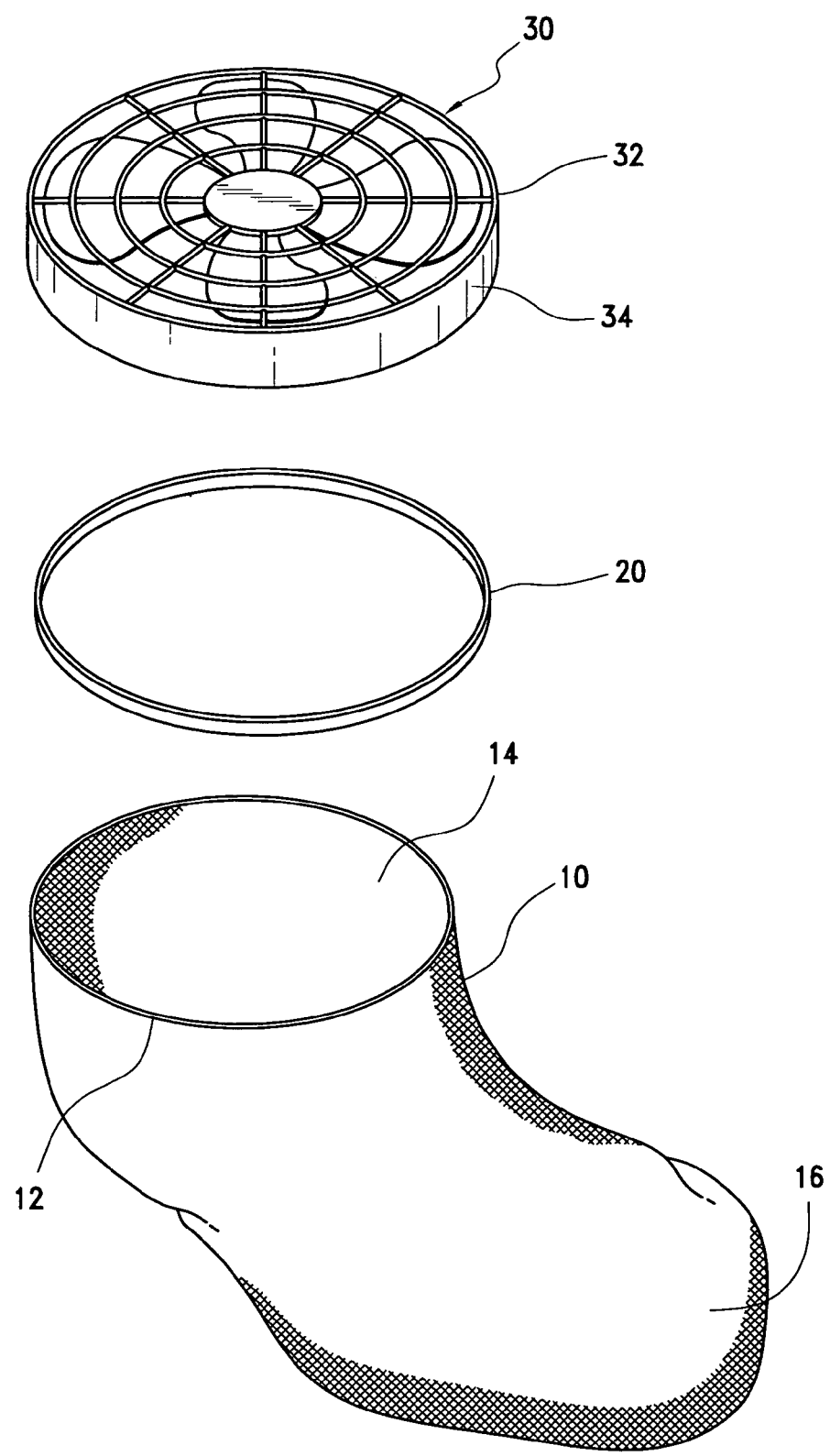
FIG. 1 is an exploded view of the airnet, closing element, and fan of a first embodiment of an air filtration system.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of an air filtration system and the components thereof, and in no way limit the structures or configurations of an air filtration system and components thereof according to the present disclosure.

DETAILED DESCRIPTION

In an exemplary embodiment, as seen in FIG. 1, an air filtration system includes an airnet filtering bag 10 having a perimeter 12 that defines an open end 14 of the airnet. Opposed to the open end 14 is a closed end 16. Thus, the airnet 10 has a generally windsock shaped configuration.

The airnet 10 is formed from a filtering fabric. The fabric may be formed from any suitable natural or synthetic materials, including, but not limited to, polyester and/or nylon and/or cotton continuous filament and/or spun yarns. For example, the fabric may be a woven natural polyester having a weave on the order of 55 cfm. The fabric may be in sheet form and folded into the generally windsock shape. The shape of the airnet 10 may be formed by sewing the filtering fabric. Alternatively, adhesives or ultrasonic welding may be utilized to create the seams necessary to provide the generally windsock shape.

The filtering fabric is an air permeable fabric that allows air to pass through the fabric, but which does not allow particulate matter, such as drywall, concrete, plaster, ceramic, and/or fiberglass particles, to pass therethrough. In an exemplary configuration, the filtering fabric has an air permeability of about 55 cfm. In other words, the filtering fabric will allow an air volume of about 55 cubic feet per minute to pass therethrough.

The airnet 10 is used in combination with the discharge end of any suitable fan 30 in order to filter particulate matter from the ambient air. In this exemplary embodiment, the fan 30 has a housing 32 that is defined by a circular perimeter 34.

As will be understood by a skilled artisan, the fan 30 has two sides. When the fan 30 is actuated ambient air will pass from the supply side, through the fan housing 32 and out of the discharge side of the fan 30.

The open end 14 of the airnet 10 is engaged with the perimeter 34 of the fan 30 around the discharge side of the fan 30 so that when the fan 30 is actuated, the ambient air will flow out of the discharge end of the fan 30 and into the airnet filtering bag 10. Thus, any particulate matter that is contained in the ambient air will be trapped within the airnet filtering bag 10, while the air permeability of airnet filtering bag 10 will allow the ambient air to flow therethrough, thus filtering the ambient air of particulate matter.

In order to maintain the airnet filtering bag 10 in place on the discharge end of the fan 30, a closing element 20 is provided around the perimeter 12 of the open end 14 of the airnet filtering bag 10.

As shown in detail in FIG. 3, the closing element 20 is positioned within a chamber 18 that is formed around the perimeter 12 of the open end 14 of the airnet filtering bag 10. The chamber 18 may be formed by folding a flap of fabric at the open end 14 over and onto itself and creating a seam by sewing, adhesion, ultrasonic welding, or any other suitable method.

The closing element 20 may be inserted into the space defining the chamber 18 prior to the step of sewing, so as to be sewn into the chamber 18.

The closing element 20 may be in the form of an elastic band or bungee cord, or any other suitable material that will provide a secure closure mechanism, as discussed below.

Figure 4:
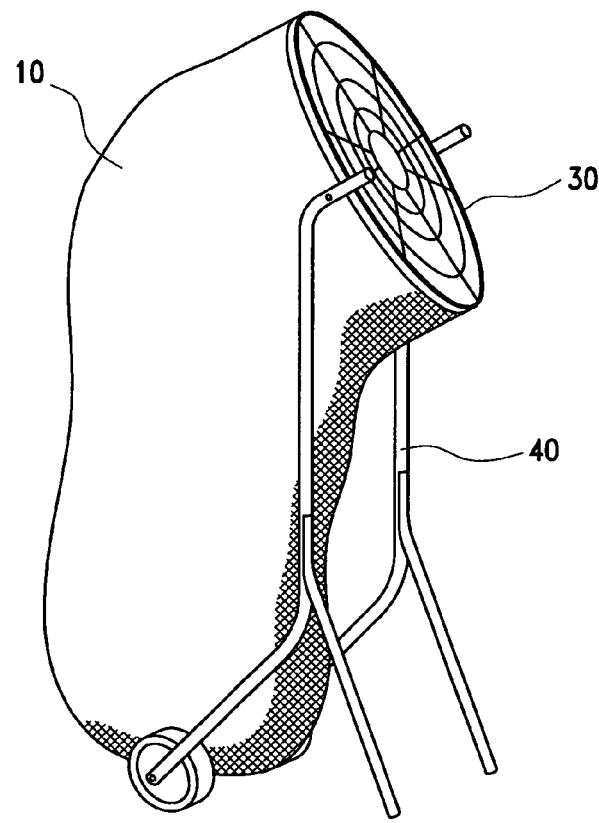
FIG. 4 is a perspective view of the air filtration system of FIG. 1 in an unactuated state.
Figure 5:
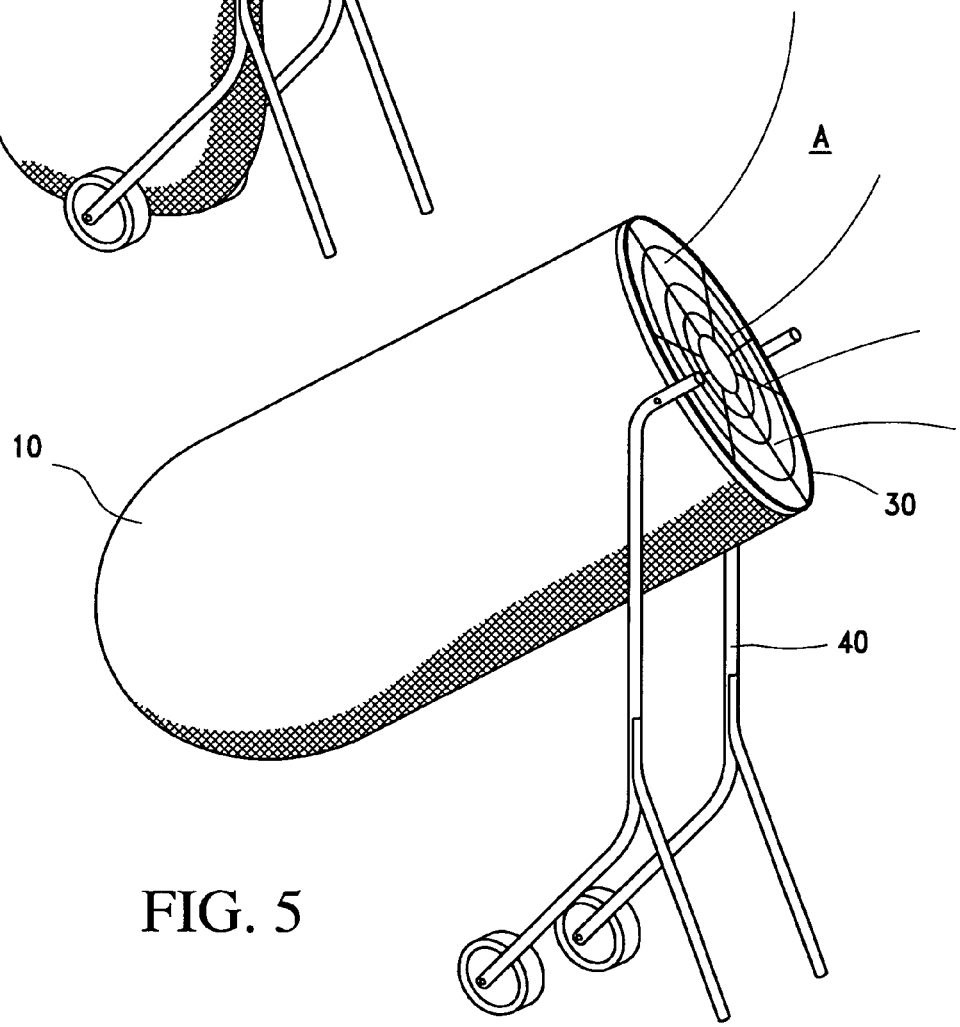
FIG. 5 is a perspective view of the air filtration system of FIG. 4 in an actuated state.

As shown in FIGS. 4 and 5, the air net 10 is secured to the perimeter 12 of the fan 30 at the discharge end of the fan 30. A suitable frame or stand 40 may be provided to elevate the fan 30 and the airnet 10 from the ground or supporting surface so that when the fan is actuated, the airnet 10 can expand under the increase in pressure provided by the airflow from the supply side to the discharge side of the fan 30.

The closing element 20 is sized such that, in an unstretched state, it is slightly smaller than the perimeter 34 of the fan 30. Thus, when the open end 14 of the air net 10 is engaged around the perimeter 34 of the fan 30, the closing element 20 will expand. In this manner, a frictional engagement between the perimeter 12 of the open end 14 of the airnet 10 and the perimeter 34 of the fan 30 is accomplished. Thus, the airnet 10 is retained in position on the fan 30 such that all of the ambient air passing from the discharge end of the fan 30 must past through the airnet filtering bag 10.

Thus, the airnet filtering bag 10 serves to accumulate the particulate matter that was suspended in the ambient air that passed through the fan.

In this exemplary embodiment, the ambient air in a substantially closed space, such as a bathroom, having a size of 5 feet by 8 feet will circulate through the airnet 10 in about 50 seconds, thus clearing the entire room of substantially all of the airborne pollutants, such as particles of concrete dust. Therefore, after the air filtering system is used in such a room for 50 seconds, it is not necessary for workers to wear masks or goggles.

After the room has been cleared of airborne particles, the fan can be turned off, and the airnet 10 removed therefrom. The airnet 10 then acts as a container for the filtered particles. The particles within the airnet 10 can be removed simply and easily to another suitable container, such as a garbage bin or dumpster. The airnet 10 may be simply turned inside out and shaken to remove all of the particulate matter.

Thus, in the exemplary embodiment shown in FIGS. 1 and 3-5, the air filtration system is set up and used in the following manner. The airnet 10 and the fan 30 are provided. The open end 14 of the airnet 10 is engaged around the perimeter 34 of the discharge end of the fan 30. The closing element 30 and the open end 14 are then closed such the airnet is retained in position on the fan 30. The assembly is positioned directly in the area where the ambient air is meant to be filtered, and the fan 30 is actuated in order to draw the ambient air therethrough, as illustrated at A in FIG. 4, and into the airnet 10. The fan 30 is left running for as long as desired in order to filter the ambient air through the airnet 10. The fan 30 is then turned off, and the airnet 10 may be removed from the fan 30.

It is noted that the fan speed may be varied depending upon the particulate sizes or weights to be filtered. For example, for lighter particulates, the fan may be set at a lower speed to provide slower blade movement in order to avoid a backpressure that may hinder the accumulation of the particulates. For larger or heavier particulates, a higher fan speed that provides a quicker blade movement may be used.

As previously mentioned, the airnet filtering bag may be connected to any suitable fan. Accordingly, in an alternative embodiment, a rectangular or square shaped box fan is utilized.

As shown in FIG. 2, the air filtration system has a similar construction to the previously discussed embodiment. An airnet filtering bag 50 having a perimeter 52 defining an open end 54 and further having an opposed closed end 56 is shown. The airnet filtering bag 50 may be constructed in the same manner as discussed above.

A rectangular or square box fan 70 having a box housing 72 that defines a rectangular or square perimeter 74 is shown. The open end 54 of the airnet 50 maybe engaged with the discharge end of the fan 70 in the manner discussed above in order to achieve the functions discussed above, with the exception of an alternative closing element 60.

As shown in FIG. 2, the closing element 60 is a draw or pull string that is substantially inelastic, and which has two free ends. The closing element 60 can be retained in a chamber around substantially the entire perimeter 52 of the open end 54 of the airnet 50 in the same manner as discussed above.

The chamber includes first and second openings 58 defined therethrough to allow the first and second free ends of the drawstring closing element 60 to extend out of the chamber.

The airnet filtering bag 50 can be engaged to the discharge end of the fan 70, and the free ends of the closing element 60 can be tied in a knot 62 (shown in phantom in FIG. 2) so as to create a frictional engagement between the perimeter 52 of the airnet and the perimeter 74 of the fan 70.

In all remaining respects, the air filtering system of this embodiment functions as described above with respect to the embodiment of FIGS. 1 and 3-5.

While particular embodiments of a portable air filtering system are discussed above utilizing specific components, the components of the system described herein may be formed in any suitable manner recognized by a skilled artisan.

It is understood that the size of the airnet and the components thereof can be adjusted in order to accommodate numerous different fan sizes and numerous different airflow settings.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The skilled artisan will recognize the interchangeability of various disclosed features. In addition to the variations described herein, other known equivalents for each feature can be mixed and matched by one of ordinary skill in this art to construct an air filtration system in accordance with principles of the present invention.

Although this invention has been disclosed in the context of certain exemplary embodiments and examples, it therefore will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

I claim:

1. A method of filtering ambient air using a portable air filtration system for construction including finishing and remodeling of interior rooms of commercial and residential buildings comprising:
   providing an airnet filtering bag having:
      an air permeable woven filtering fabric having an air permeability of about 55 cfm and formed in a general windsock shape having a first open end defined by a perimeter and a second closed end; and
      a closing element retained in a chamber positioned along the first open end and defined around substantially the entire perimeter of the first open end;
   providing a fan having a perimeter and a discharge end;
   engaging the first open end with the perimeter of the fan around the discharge end;
   closing the closing element and the first open end around the perimeter of the fan in order to retain the airnet in position thereon; and
   actuating the fan in order filter ambient air through the airnet; when the fan is actuated ambient air will pass from the supply side through the fan housing and out of the discharge side of the fan into the filtering fabric.

2. The method according to claim 1, wherein the perimeter of the fan is substantially circular in shape.

3. The method according to claim 1, wherein the perimeter of the fan is substantially rectangular or square in shape.

4. The method according to claim 1, further comprising forming the chamber by folding over and sewing a flap of the fabric at the first open end onto itself; and
   the closing element is an elastic member sewn into the chamber and extends around the perimeter of the first open end.

5. The method according to claim 1, further comprising tying a knot with first and second free ends of a pull cord, which forms the closing element, that respectively extend through first and second openings defined in the chamber in order to retain the airnet in position on the fan.

* * * * *